United States Patent [19]

Nagano

[11] Patent Number: 5,246,405
[45] Date of Patent: Sep. 21, 1993

[54] FRONT DERAILLEUR FOR A BICYCLE

[75] Inventor: Masashi Nagano, Izumi, Japan

[73] Assignee: Shimano, Inc., Osaka, Japan

[21] Appl. No.: 897,938

[22] Filed: Jun. 15, 1992

[30] Foreign Application Priority Data

Jun. 21, 1991 [JP]  Japan .................................. 3-150106

[51] Int. Cl.$^5$ .............................................. F16H 7/18
[52] U.S. Cl. ..................................... 474/140; 474/80
[58] Field of Search .............................. 474/140, 78–82

[56] References Cited

U.S. PATENT DOCUMENTS 4,078,444  3/1978  Huret ............................. 474/140 X
4,237,743 12/1980  Nagano ........................ 474/140 X

FOREIGN PATENT DOCUMENTS 083270  7/1983  European Pat. Off. .
428085  5/1991  European Pat. Off. .

*Primary Examiner*—Thuy M. Bui
*Attorney, Agent, or Firm*—Dickstein, Shapiro & Morin

[57] ABSTRACT

A bicycle front derailleur has a guide assembly for shifting a chain among a plurality of sprockets of different sizes. The guide assembly comprises an outer guide plate, an inner guide plate extending substantially parallel to the outer guide plate, and bridge members interconnecting the outer and inner guide plates in a spaced relationship. The inner guide plate includes an upper plate portion, and a lower plate portion extending from the upper plate portion. The lower plate portion includes a first plate portion and a second plate portion, the second plate portion being elastically deformable relative to the first plate portion axially of the sprockets.

6 Claims, 4 Drawing Sheets

5,246,405

FRONT DERAILLEUR FOR A BICYCLE

BACKGROUND OF THE INVENTION

1. Field of the Invention

The present invention relates to a front derailleur for a bicycle, and more particularly to a front derailleur including a guide plate member movable by a shifting operation along a rotational axis of a front sprocket assembly to push a bicycle chain and shift the chain among three, large, intermediate and small, sprockets.

2. Description of the Related Art

In the above front derailleur, a chain trouble has often been encountered when the chain is shifted from the small sprocket to the large sprocket, the two sprockets having a great difference in diameter therebetween. That is, the front sprocket assembly often becomes unrotatable with the chain arrested between the large sprocket and an inner guide plate of the front derailleur. U.S. Pat. No. 4,078,444 discloses a solution to this problem, which provides an additional, auxiliary plate for contacting the chain. This auxiliary plate is attached to the inner guide plate to be elastically displaceable axially of the sprocket assembly. However, this prior construction has the disadvantages that the material for forming the auxiliary plate requires a drawing process, and that an irksome operation is involved in attaching the auxiliary plate to the inner guide plate.

SUMMARY OF THE INVENTION

An object of the present invention is to provide a front derailleur easy to design and manufacture, and yet capable of a smooth chain shift from a small sprocket to an intermediate sprocket, and from the intermediate sprocket to a large sprocket without trouble, i.e. free from the trouble of the front sprocket assembly becoming unrotatable with the chain arrested between the large sprocket and the inner guide plate of the front derailleur, and from the large sprocket to the intermediate sprocket with a reduced chance of the chain falling off.

The above object is fulfilled, according to the present invention, by a bicycle front derailleur with a guide assembly having an outer guide plate, an inner guide plate extending substantially parallel to the outer guide plate, and bridge members interconnecting the outer and inner guide plates in a spaced relationship, in which the inner guide plate comprises an upper plate portion, and a lower plate portion extending from the upper plate portion and including a first plate portion and a second plate portion, the second plate portion being elastically displaceable relative to the first plate portion axially of the sprockets.

In a preferred embodiment of the invention, the inner guide plate has a large width extending toward the axis of front sprockets to shift the chain from a small sprocket to an intermediate sprocket smoothly, and to positively prevent the chain from falling off during a shift from a large sprocket to the intermediate sprocket. The inner guide plate defines a cutout extending along a boundary between the second plate portion and upper plate portion and substantially parallel to outer circumferences of the sprockets, to render the second plate portion elastically displaceable axially of the sprockets. When the chain is shifted from the large sprocket to the intermediate sprocket, the second plate portion becomes deformed to apply a resistance for preventing the chain from falling off over the intermediate sprocket. When the chain is shifted from the intermediate sprocket to the large sprocket, the upper plate portion contacts the chain in a final stage of the shifting operation to place the chain in engagement with the large sprocket. If the cyclist effects a shift operation too hastily, this upper plate portion may, before engagement of the chain with the large sprocket, approach the large sprocket past a point of distance thereto set for chain engagement. Then, the second plate portion pushes the chain and becomes elastically deformed relative to the other plate portions. In this way, the pressing force is appropriately reduced to avoid the inconvenience of arresting the chain between the inner guide plate and large sprocket.

Other objects and features of this invention will be understood from the following more detailed description taken with reference to the accompanying drawings.

DETAILED DESCRIPTION OF THE PREFERRED EMBODIMENTS

Figure 1:
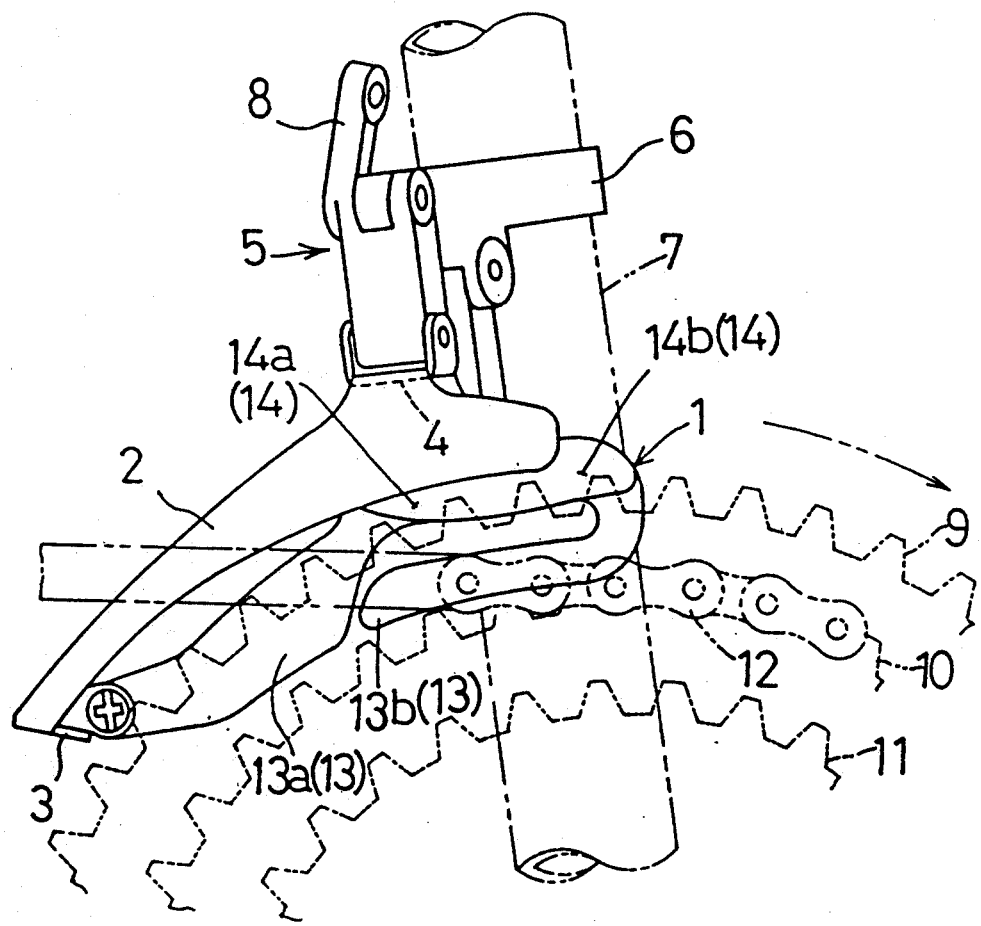
FIG. 1 is a side view of a front derailleur according to the present invention.
Figure 3:
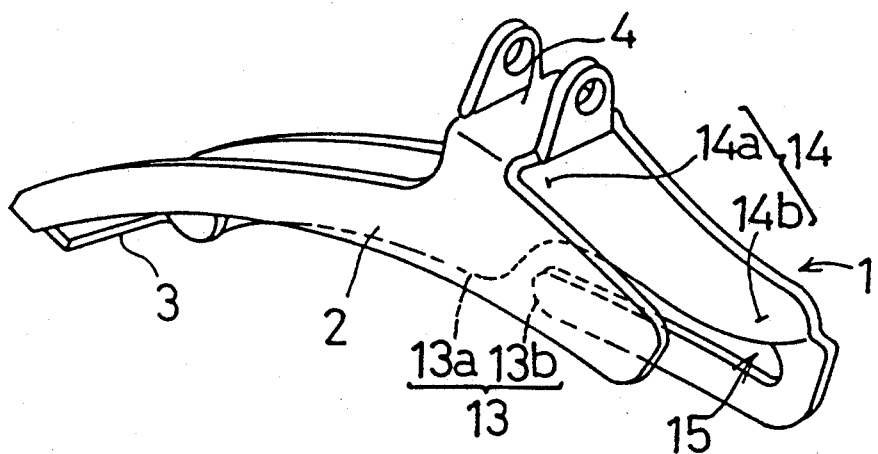
FIG. 3 is a perspective view of the front derailleur.

Referring to FIGS. 1 and 3, a front derailleur for a bicycle includes an inner guide plate 1 and an outer guide plate 2 interconnected through a pair of connecting plates 3 and 4. As shown in FIG. 1, the front derailleur is secured to a bicycle frame 7 through a link mechanism 5 attached to one of the connecting plates 4 and a mounting element 6 connected to the link mechanism 5. The front derailleur further includes a control arm 8 connected to a shift lever (not shown) through a derailleur cable (not shown). The control arm 8 is pivotable by the shift lever about a support axis provided by the mounting element 6, to swing the link mechanism 5. As a result, the guide plates 1 and 2 move along an axis of rotation of three, large, intermediate and small, sprockets 9, 10 and 11, to shift a chain 12 from one sprocket to another.

When the shift lever is operated for acceleration, the guide plates 1 and 2 are moved toward the large sprocket 9, with the inner guide plate 1 pushing the chain 12. Consequently, the chain 12 is shifted from the small sprocket 11 to the intermediate sprocket 10 or from the intermediate sprocket 10 to the large sprocket 9. When the shift lever is operated for deceleration, the guide plates 1 and 2 are moved toward the small sprocket 11, with the outer guide plate 2 pushing the chain 12. Consequently, the chain 12 is shifted from the large sprocket 9 to the intermediate sprocket 10 or from the intermediate sprocket 10 to the small sprocket 11.

More particularly, when the chain 12 is shifted from a low speed position engaging the small sprocket 11 to a higher speed position, a lower and rearward, first plate portion 13a of the inner guide plate 1 pushes the chain 12 toward the intermediate sprocket 10 during an early stage of the shifting operation in which the inner guide plate 1 moves outward. As a result, the chain 12 is raised from teeth of the small sprocket 11 and moved toward the intermediate sprocket 10. During later stages of the shifting operation, the position of the inner guide plate 1 contacting the chain 12 shifts forwardly to a lower, second plate portion 13b due to contact of the chain 12 with a side surface of the intermediate sprocket 10 and rotation of the intermediate sprocket 10. Then the second plate portion 13b pushes the chain 12 toward the intermediate sprocket 10, thereby engaging the chain 12 with the intermediate sprocket 10.

When the chain 12 is shifted from an intermediate speed position engaging the intermediate sprocket 10 to a higher speed position, a rearward region 14a of an upper plate portion 14 of the inner guide plate 1 pushes the chain 12 toward the large sprocket 9 during an early stage of the shifting operation in which the inner guide plate 1 moves further outward. As a result, the chain 12 is raised from teeth of the intermediate sprocket 10 and moved toward the large sprocket 9. During later stages of the shifting operation, the position of the inner guide plate 1 contacting the chain 12 shifts to a forward region 14b of the upper plate portion 14 due to contact of the chain 12 with a side surface of the large sprocket 9 and rotation of the large sprocket 9. Then the forward region 14b of the upper plate portion 14 pushes the chain 12 toward the large sprocket 9, thereby engaging the chain 12 with the large sprocket 9.

When the chain 12 is shifted down from the high speed position engaging the large sprocket 9, the outer guide plate 2 pushes the chain 12 toward the intermediate sprocket 10. As a result, the chain 12 is raised from teeth of the large sprocket 9 and moved toward the intermediate sprocket 10, whereby the chain 12 engages the intermediate sprocket 10. At this time, the second plate portion 13b lies laterally of the teeth of the intermediate sprocket 10. The second plate portion 13b contacts the chain 12 shifted from the large sprocket 9 to the intermediate sprocket 10 and tending, by inertia, to move over the intermediate sprocket 10 toward the small sprocket 11. Thus, the second plate portion 13b holds the guides the chain 12 for engagement with the intermediate sprocket 10.

When the chain 12 is shifted down from the intermediate speed position engaging the intermediate sprocket 10, the outer guide plate 2 pushes the chain 12 toward the small sprocket 11. As a result, the chain 12 is raised from teeth of the intermediate sprocket 10 and moved toward the small sprocket 11, whereby the chain 12 engages the small sprocket 11.

Figure 2:
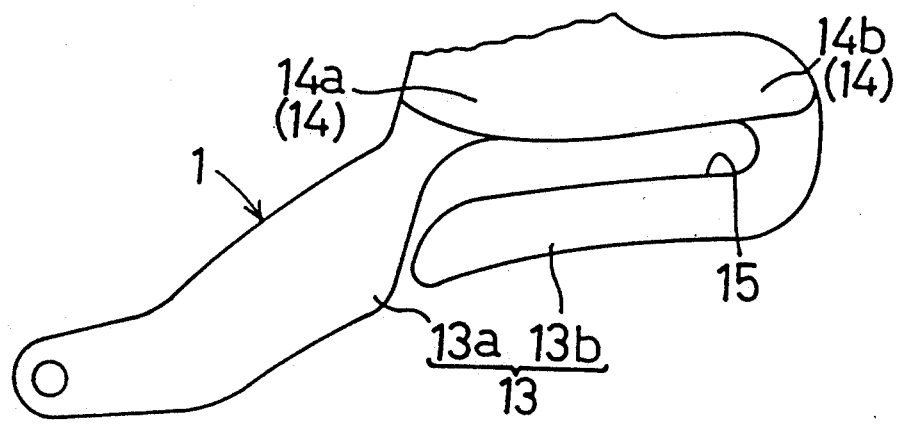
FIG. 2 is a side view of an inner guide plate.

As shown in FIG. 2, the inner guide plate 1 is formed of a sheet metal having a cut out 15 to form a tongue extending from a forward position of the remaining, larger part of the sheet metal. The tongue defines the second plate portion 13b, while the rest of the sheet metal defines the first plate portion 13a and upper plate portion 14. Thus, the entire inner guide plate 1 is formed of the sheet metal of uniform property. However, the second plate portion 13b, because of its shape and connection to the rest of the sheet metal, is elastically deformable axially of the sprockets 9, 10 and 11 with greater ease than the other plate portions 13a and 14. The chain 12 could become arrested between the inner guide plate 1 and large sprocket 9 during the shift from intermediate speed to high speed if the second plate portion 13b were rigid. The construction according to the present invention is effective to avoid such trouble by means of the elastically deformable second plate portion 13b.

Figure 4:
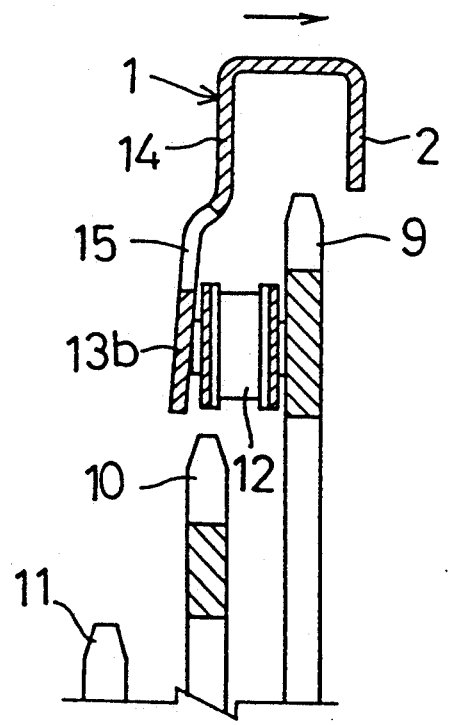
FIG. 4 is a sectional view of the front derailleur.

Specifically, as shown in FIG. 4, the second plate portion 13b is disposed closer than the upper plate portion 14 to the axis of rotation of the sprockets 9-11, to sandwich the chain 12 with the side surface of the large sprocket 9 during the shift from intermediate speed to high speed. When, with movement of the inner guide plate 1, the upper plate portion 14 moves to a point of distance set for engaging the chain 12 with the large sprocket 9, and further approaches the large sprocket 9 beyond that point of distance, the second plate portion 13b is elastically deformed by a reaction of contact with the chain 12 to remain closer than the other plate portions 13a and 14 to the intermediate sprocket 10. Consequently, the second plate portion 13b presses the chain 12 against the large sprocket 9 with a weaker force than if the second plate portion 13b were not deformable. In the embodiment shown in FIG. 2, the second plate portion 13b may have a rear end thereof slightly bent away from the outer guide plate 2 to prevent the chain 12 from engaging the rear end when the chain 12 is raised through contact with the inner guide plate 1 during an accelerating shift operation.

FIGS. 5 through 8 show inner guide plates 1 in other embodiments of the invention.

Figure 5:
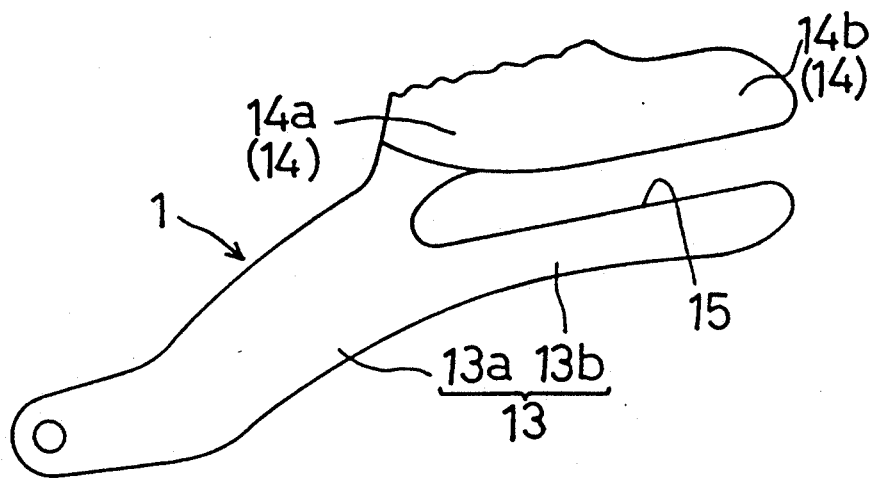
FIG. 5 is a side view of an inner guide plate in another embodiment of the invention.

In FIG. 5, the inner guide plate 1 is formed of a sheet metal having a cutout 15 to form a tongue extending from a rearward position of the remaining, larger part of the sheet metal. The tongue defines the second plate portion 13b, while the rest of the sheet metal defines the first plate portion 13a and upper plate portion 14. The second plate portion 13b, because of its shape and connection to the rest of the sheet metal, is elastically deformable axially of the sprockets 9, 10 and 11 with greater ease than the other plate portions 13a and 14. Although the entire inner guide plate 1 is formed of the sheet metal of uniform property, the second plate portion 13b, because of its connection to the rest of the sheet metal, is elastically deformable relative to the other plate portions 13a and 14. In the embodiment shown in FIG. 5, the second plate portion 13b may be bent slightly away from the outer guide plate 2 to prevent the chain 12 from engaging a forward end thereof when the chain 12 is lowered through contact with the inner guide plate 1 under guiding action of the outer guide plate 2 during a decelerating shift operation.

Figure 6:
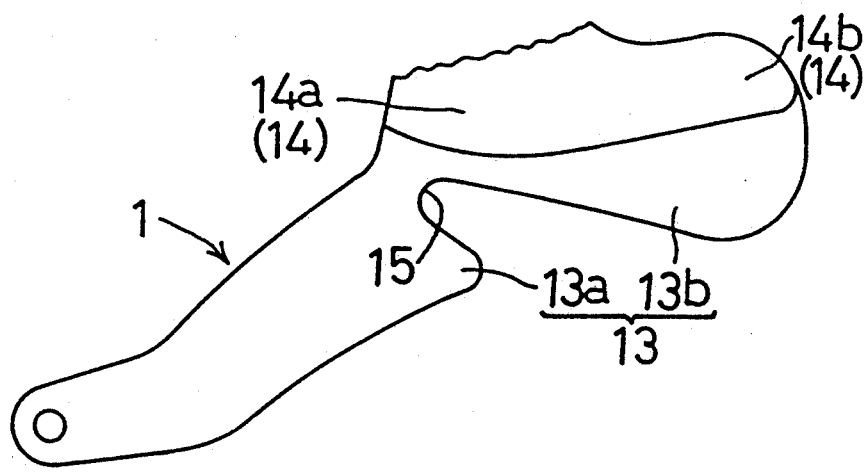
FIG. 6 is a side view of an inner guide plate in yet another embodiment of the invention.

In FIG. 6, the inner guide plate 1 is formed of a sheet metal having a cutout 15 to form a triangular portion tapered forwardly from a rear end of the guide plate 1. The triangular portion defines the second plate portion 13b, while the rest of the sheet metal defines the first plate portion 13a and upper plate portion 14. The second plate portion 13b, because of its shape and connection to the rest of the sheet metal, is elastically deformable axially of the sprockets 9, 10 and 11 with greater ease than the other plate portions 13a and 14. Although the entire inner guide plate 1 is formed of the sheet metal of uniform property, the second plate portion 13b, because of its shape, is elastically deformable relative to the other plate portions 13a and 14.

Figure 7:
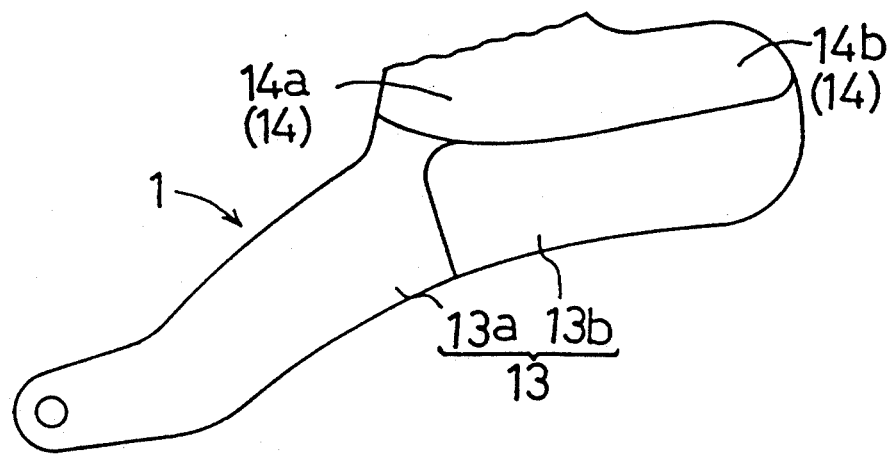
FIG. 7 is a side view of an inner guide plate in a further embodiment of the invention.

In FIG. 7, the inner guide plate 1 includes a second plate portion 13b having a thinner wall thickness than the first plate portion 13a and upper plate portion 14. Thus, although the entire inner guide plate 1 is formed of a sheet metal of uniform properly, the second plate portion 13b is elastically deformable relative to the other plate portions 13a and 14.

Figure 8:
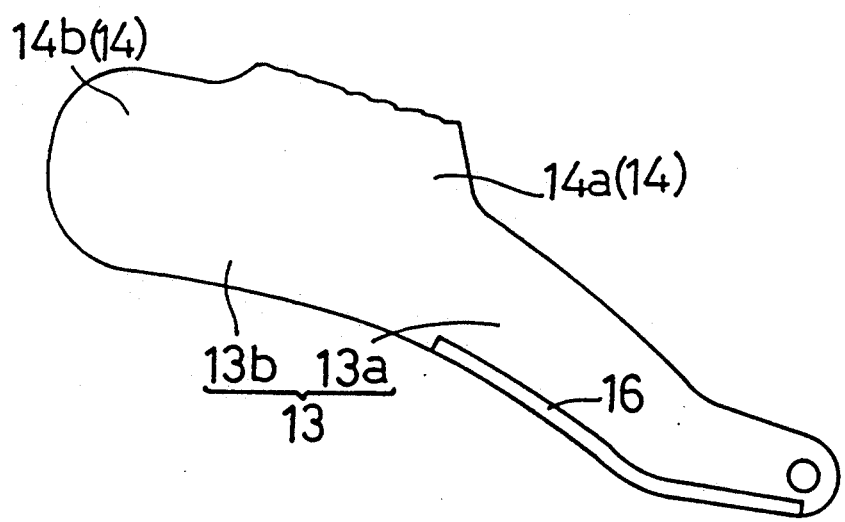
FIG. 8 is a side view of an inner guide plate in a still further embodiment of the invention.

In FIG. 8, the inner guide plate 1 is formed of a relatively thin sheet metal, with a first plate portion 13a enforced by a rib 16 attached to an outward surface thereof. With this construction, a second plate portion 13b is elastically deformable, while the other plate portions 13a and 14 are stronger and less deformable than the second plate portion 13b.

What is claimed is:

1. In a bicycle front derailleur with a guide assembly for shifting a chain among a plurality of sprockets of different sizes, the guide assembly having an outer guide plate, an inner guide plate extending substantially parallel to the outer guide plate, and bridge means interconnecting the outer and inner guide plates in a spaced relationship, said inner guide plate comprising:
    an upper plate portion; and
    a lower plate portion extending from said upper plate portion and including a first plate portion and a second plate portion, said second plate portion being elastically deformable relative to said first plate portion axially of said sprockets.

2. A guide assembly of a bicycle front derailleur as claimed in claim 1, wherein said inner guide plate includes a cutout extending substantially longitudinally of said inner guide plate for isolating said second plate portion from said upper plate portion and said first plate portion, said second plate portion being connected to said upper plate portion at a forward end only.

3. A guide assembly of a bicycle front derailleur as claimed in claim 1, wherein said inner guide plate includes a cutout extending substantially longitudinally of said inner guide plate for isolating said second plate portion from said upper plate portion, said second plate portion being connected to said first plate portion only.

4. A guide assembly of a bicycle front derailleur as claimed in claim 1, wherein said inner guide plate includes a cutout extending substantially transversely of said inner guide plate along a boundary between said first plate portion and said second plate portion.

5. A guide assembly of a bicycle front derailleur as claimed in claim 1, wherein said second plate portion has a thinner wall thickness than said first plate portion and said upper plate portion.

6. A guide assembly of a bicycle front derailleur as claimed in claim 1, wherein said inner guide plate as a whole is formed thin to be elastically deformable axially of said sprockets, said first plate portion having a reinforcing rib extending along a lower edge of an outward surface thereof to prevent deformation of said first plate portion.

* * * * *